United States Patent
Gautier et al.

(10) Patent No.: US 8,964,910 B2
(45) Date of Patent: Feb. 24, 2015

(54) METHOD FOR IDENTIFYING AND DETECTING A RADIO SIGNAL FOR A COGNITIVE COMMUNICATION SYSTEM

(71) Applicant: Commissariat a l'Energie Atomique et aux Ene Alt, Paris (FR)

(72) Inventors: Matthieu Gautier, Meylan (FR); Dominique Noguet, Saint-Simeon-de-Bressieux (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/803,709

(22) Filed: Mar. 14, 2013

(65) Prior Publication Data
US 2013/0251014 A1    Sep. 26, 2013

(30) Foreign Application Priority Data
Mar. 15, 2012    (FR) .................................... 12/52326

(51) Int. Cl.
*H04L 27/28*    (2006.01)
*H04K 1/10*    (2006.01)

(52) U.S. Cl.
USPC ............................. 375/343; 375/260; 713/176

(58) Field of Classification Search
CPC ........................ H04L 27/0006; H04L 27/0012
USPC ......... 375/130, 141, 142, 146, 147, 150, 224, 375/225, 227, 295, 298, 302, 303, 340, 343, 375/260; 358/3.28; 713/176, 180
See application file for complete search history.

(56) References Cited

U.S. PATENT DOCUMENTS

| 7,031,492 | B1 * | 4/2006 | Furon et al. | 382/100 |
| 7,478,241 | B2 * | 1/2009 | Le Floch | 713/176 |
| 8,254,497 | B2 | 8/2012 | Jallon | |
| 2002/0131617 | A1 * | 9/2002 | Pelly et al. | 382/100 |
| 2002/0141611 | A1 * | 10/2002 | Keating et al. | 382/100 |
| 2006/0251251 | A1 * | 11/2006 | Pelly | 380/201 |
| 2010/0195705 | A1 | 8/2010 | Jallon | |

FOREIGN PATENT DOCUMENTS

FR    2 919 135 A1    1/2009

OTHER PUBLICATIONS

Joseph Mitola III, "Cognitive radio: An Integrated Agent Architecture for Software Defined Radio", Royal Institute of Technology, Teleinformatics, Electrum 204, PhD Dissertation, May 8, 2000, 313 pages.

(Continued)

*Primary Examiner* — Young T. Tse
(74) *Attorney, Agent, or Firm* — Oblon, Spivak, McClelland, Maier & Neustadt, L.L.P.

(57) ABSTRACT

A method of identifying an RF signal for a cognitive radio system. The signal is identified with a digital watermarking performed downstream from the digital modulation of the symbols to be transmitted. A method of detecting an RF signal watermarked is also disclosed. The identification method includes demodulating the received RF signal as a baseband, converting it digitally, and correlating the digital signal obtained with a predetermined digital signature. The correlation values are averaged using a recursive filter and the maximum value of the average values output from the filter is compared to a threshold to decide whether the RF signal is present.

16 Claims, 3 Drawing Sheets

(56) References Cited

OTHER PUBLICATIONS

Carlos Cordeiro, et al., "IEEE 802.22: An Introduction to the First Wireless Standard based on Cognitive Radios", Journal of Communications, vol. 1 No. 1, Apr. 2006, pp. 38-47.

Paul D. Sutton, et al., "Cyclostationary Signatures in Practical Cognitive Radio Applications", IEEE Journal on Selected Areas in Communications, vol. 26, No. 1, Jan. 2008, pp. 13-24.

French Preliminary Search Report issued Dec. 13, 2012, in Patent Application No. FR 1252326 (FA 763444) (with English Translation of Category of Cited Documents).

Leandro de.C. T. Gomes, et al., "Tatouage audio exploitant des proprietes de cyclostationnarité", (Cyclostationarity-based audio watermarking), Traitment du Signal 2001, vol. 19, No. 1, XP-002682764, Feb. 19, 2004, pp. 1-9, URL:http://documents.irevues.inist.fr/bitstream/handle/2042/2194/Bonnet%E2%80%931009.pdf?sequence=1>.

* cited by examiner

METHOD FOR IDENTIFYING AND DETECTING A RADIO SIGNAL FOR A COGNITIVE COMMUNICATION SYSTEM

TECHNICAL FIELD

The present invention relates to radio systems known as Cognitive or Opportunistic Radio systems, and more particularly to the identification and/or detection of a radio signal by such a system.

STATE OF THE PRIOR ART

The increasing congestion of the spectrum has led to envisage telecommunication systems which are capable of coexisting with the system of previously allocated frequency bands, known as "primary" bands. Two coexistence strategies are currently the subject of substantial research. The first consists in using a very low signal level, by virtue of a very great spectral spreading; this is the approach taken by Ultra Wide Band systems, also called UWB systems. The second consists in using, in an opportunistic manner, a portion of the spectrum which is sporadically or temporarily unoccupied; this is the approach known as the Cognitive Radio approach. A description of cognitive radio will be found in the thesis of J. Mitola entitled "Cognitive radio: an integrated agent architecture for software defined radio", Royal Institute of Technology, Stockholm, PhD Dissertation, 8 May 2000.

The principle of cognitive radio has notably been chosen for the development of long-range wireless networks, also called WRAN (Wireless Regional Area Network). These networks are currently the subject of a standardisation process within the IEEE 802.22 working group. More specifically, this standard pending development proposes to use the vacant UHF and VHF bands opportunistically to establish a point-to-point wireless transmission in a true WRAN network. An introduction to the IEEE 802.22 standard will be found in the article of C. Cordeiro et al. entitled "IEEE 802.22: an introduction to the first wireless standard base on cognitive radios", published in Journal of Communications, Vol. 1, No 1, April 2006, pp. 38-47. It is planned in particular that the UHF bands allocated to the terrestrial broadcasting television system may be used to this end. The standard used in many countries for digital broadcasting is DVB-T (Digital Video Broadcast-Terrestrial). It uses an OFDM (Orthogonal Frequency Division Multiplexing) modulation to transmit compressed video/audio streams.

Radio systems opportunistically using a portion of the spectrum which is sporadically or temporarily unoccupied by a primary system are hereinafter called cognitive systems. Before being able to transmit in a given band, a cognitive system must be able to determine beforehand whether a primary system is using this band.

Many methods have been proposed for detecting the occupation of a band by primary systems. They often exploit the fact that the signals transmitted by these systems are generally cyclostationary, or in other words that their autocorrelation function is periodic. This is the case notably with OFDM signals transmitted by primary DVB-T systems.

In addition, even if a frequency band is not used by a primary system, it may be desirable to determine whether another cognitive system is present in a given band, either to assess the quality of the channel with a view to a transmission, or to identify, coordinate and exchange data with another cognitive system.

A first solution to identify the presence of a cognitive system is to use a common control channel. However, this solution uses precious resources.

A second solution consists in introducing a cyclostationary signature into the signal transmitted by a cognitive system, as described in the article of P. D. Sutton et al. entitled "Cyclostationary signatures in practical cognitive radio applications" published in IEEE Journal on Selected Areas in Comm., vol. no 26, No 1, January 2008, pages 13-24. This article proposes to generate, in addition to the cyclostationarity inherent to an OFDM signal, a second-order cyclostationary signature, by repeating within the multiplex of sub-carriers a block of modulation symbols to be transmitted. The cyclic frequency of this signature enables to encode coordination information between cognitive systems. This second solution also has the disadvantage that it uses spectral transmission resources (sub-carrier intervals) and consequently reduces spectral efficiency. In addition, this solution applies only to a signal obtained by OFDM modulation.

The problem underlying the invention is to propose a method enabling the presence of a signal to be identified and/or detected by a cognitive radio system which is independent of the type of modulation used, and which does not require additional spectral resources to be used.

DESCRIPTION OF THE INVENTION

The present invention is defined as a method of identifying an RF signal for a cognitive radio system, in which:
  a digital modulation of symbols to be transmitted is performed to obtain a stream of modulation symbols;
  a digital signature is added to the stream of modulation signals to obtain a watermarked signal, where the said signature has an amplitude which is substantially lower than the said modulation symbols;
  the signal thus watermarked is transposed into the RF band.

The watermarked signal is obtained by digitally adding the digital signal to the stream of modulation symbols, and by performing a digital-analog conversion of the resulting stream.

The watermarked signal is advantageously obtained by performing a digital-analog conversion of the stream of modulation symbols, firstly, to generate a first analog signal, and of the digital signature, secondly, to generate a second analog signal, and by summing the first and second analog signals obtained in this manner.

According to a first embodiment, the digital signature is a Gold code.

According to a second embodiment, the digital signature is a Hadamard code.

According to a first variant the digital modulation is a multi-carrier modulation.

According to a second variant the digital modulation is a single-carrier modulation.

The present invention also relates to a cognitive radio system, of an RF signal identified using the previous identification method, in which:
  the RF signal is transposed to baseband obtain an analog baseband signal;
  an analog-digital conversion of the analog-digital baseband signal is performed to obtain a digital signal;
  the digital signal is correlated with a predetermined digital signature to obtain a correlation value;
  the said correlation value is compared to a threshold value; and it is decided that the said RF signal is present if the said correlation value is greater than the threshold value, and that it is absent in the contrary case.

Correlation values are advantageously obtained for multiple successive correlation windows, and an average of the correlation values thus obtained is made to obtain average correlation values.

The average of the correlation values may be obtained using a recursive filter with a forgetting coefficient.

A maximum correlation value can also be determined from the average correlation values supplied by the said filter, where the decision is then taken on the basis of the said maximum correlation value.

According to a first variant the said digital signal is a Gold code.

According to a second variant the said digital signal is a Hadamard code.

BRIEF DESCRIPTION OF THE ILLUSTRATIONS

Other characteristics and advantages of the invention will appear on reading a preferential embodiment of the invention, made in reference to the attached figures, among which:

DETAILED ACCOUNT OF PARTICULAR EMBODIMENTS

We once again consider in what follows a cognitive system (sometimes also called a secondary system) wishing to determine whether a radio signal is present in a given frequency band. According to a first scenario the cognitive system wishes beforehand to determine whether this band is already used by a primary system in order to be able to transmit to it. According to a second scenario the cognitive system wishes to determine whether another given cognitive system is already present in this band, such that it is able to communicate with it or transmit to it. Other types of scenario may be envisaged without going beyond the scope of the present invention.

The idea underlying the present invention is to identify (in the sense of "sign"), a signal of a primary or cognitive system by adding a digital watermark to it. This digital watermark can then be detected by another cognitive system by means of a simple correlation operation, as explained below.

Figure 1:
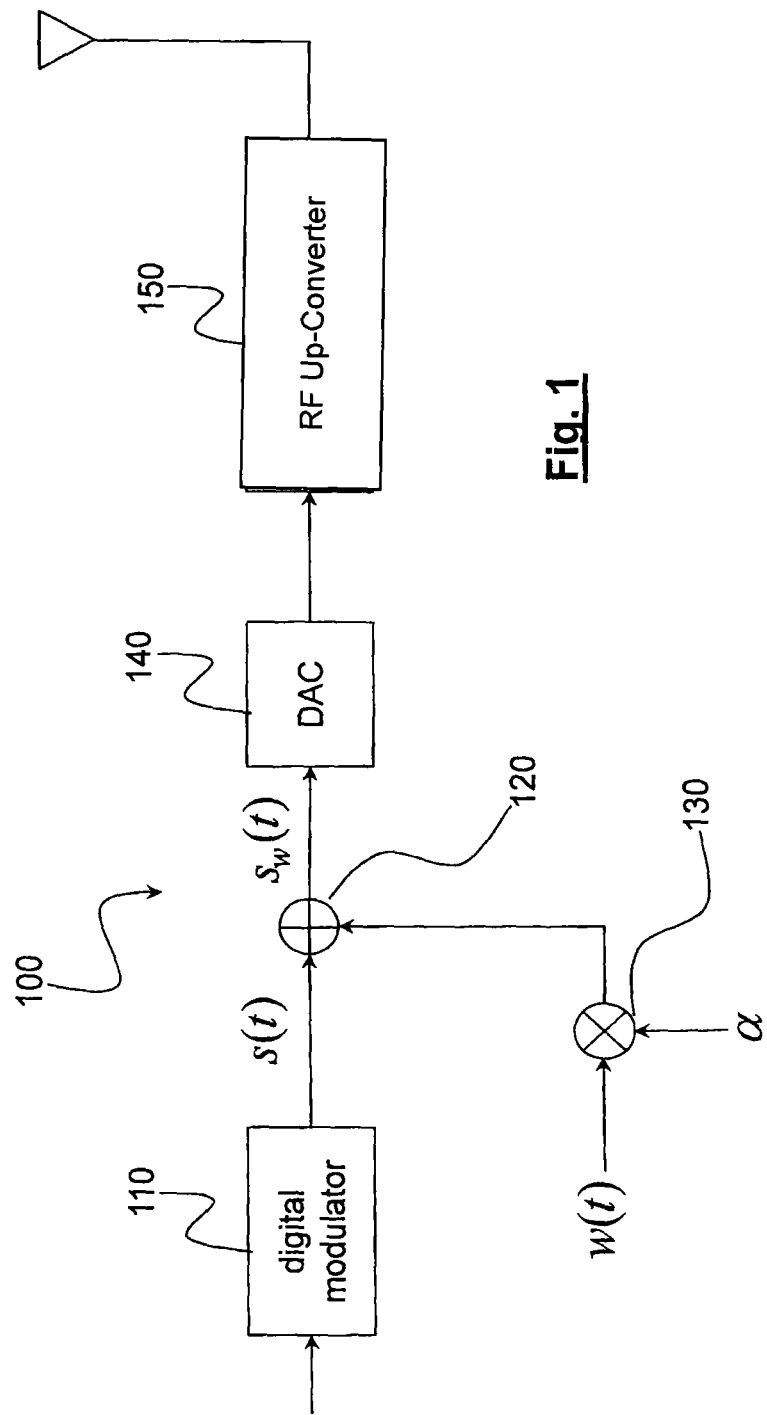
FIG. 1 represents schematically a transmitter enabling a radio signal to be identified by digital watermarking according to one embodiment of the present invention.

FIG. 1 represents the radio transmitter of a primary or cognitive system, intended to add a digital watermark to identify a radio signal.

Transmitter 100 includes a digital modulator 110 modulating the data to be transmitted in the form of modulation symbols. The modulation may be of different types, for example a Q-ary modulation using a modulation constellation of the QAM or PSK type, whether or not followed by an OFDM modulation, a spectral spreading using orthogonal sequences, etc. It will thus be understood that the transmitter can be that of an OFDM system, for example the transmitter of a DVB-T system, or again a transmitter of a DS-CDMA (Direct Sequence CDMA) system, in a manner known as such.

A digital signature w(t) is added to the stream of modulation symbols outputted by means of adder 120. A multiplier weighting the digital signature by a coefficient $\alpha$ before it is added to the modulation symbols has been represented schematically in 130. This reflects the fact that the digital signature is added with a low binary weight compared to that of these symbols. For example, if the modulation symbols are expressed over N bits, the digital signature can simply be encoded using the last LSB.

It is important to note that the digital signature is in this case independent of the type of modulation used. The digital signature is advantageously chosen from a family of sequences having a pronounced autocorrelation peak, in order that it may be detected easily, and a low rate of intercorrelation, in order that it may be discriminated easily from another signature. It will be possible to opt for a pseudo-random sequence such as an m-sequence or a Gold code. Alternatively, it will be possible to opt for a code belonging to a family of orthogonal codes such as Hadamard codes.

The addition of a digital signature of low amplitude compared to the signal to be transmitted may be considered as a digital watermarking of this signal.

The digital signal s(t) watermarked by signature w(t) is noted $s_w(t)$. Signal $s_w(t)$ is converted into an analog signal using a digital-analog converter 140. The analog signal obtained in this manner is then transposed into the RF band by means of the RF modulation means, 150. For example, in the case of an OFDM transmitter, the OFDM symbols, watermarked by the digital signature, modulate an RF carrier in 150.

Alternatively, the digital signature may be added to the signal, in an analog manner, at the output from converter 140, prior to transposition into the RF band. In all cases, the amplitude of the signature is chosen to be substantially lower than that of the signal to be transmitted (advantageously 15 to 30 dB below the amplitude of the signal to be transmitted).

Figure 2:
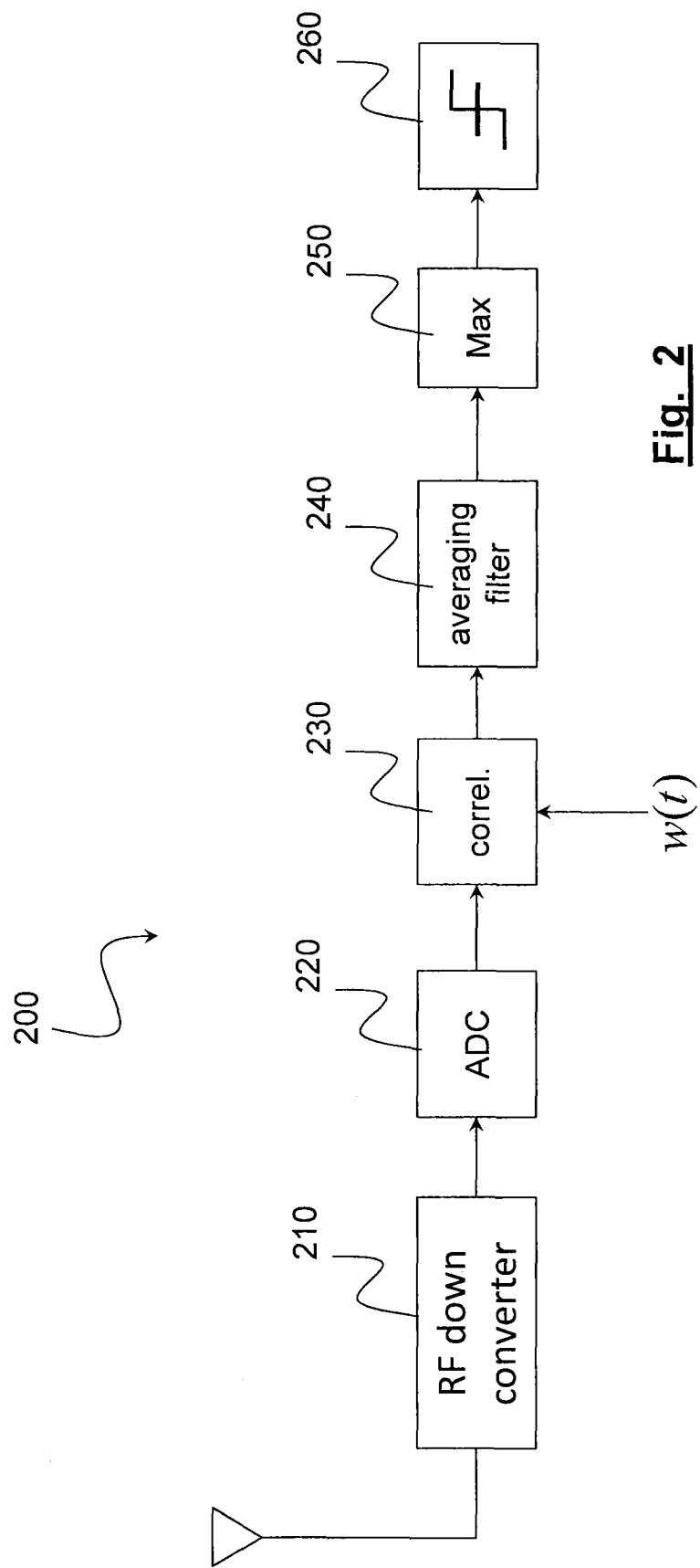
FIG. 2 represents schematically a receiver enabling a radio signal transmitted by the transmitter of FIG. 1 to be detected, according to one embodiment of the invention.

FIG. 2 represents a radio receiver of a cognitive system, intended to detect a radio signal transmitted by the transmitter of FIG. 1.

Receiver 200 includes an RF demodulation module, 210, transposing the received baseband signal, followed by an analog-digital converter, 220. The digital signal produced by converter 220 is correlated, by means of correlator 230, with the digital signature of the signal the presence of which it is desired to detect, in this case w(t). The correlation window used by the correlator is equal to length L of the digital signature.

An averaging filter, 240, for example a first-order recursive filter (an IIR filter), makes a sliding average with a forgetting coefficient, for the correlation values obtained at the output of the correlator. This operation enables the robustness of the detection to be improved in the case of a low signal-to-noise ratio.

The maximum correlation value is detected by means of detection module 250, and then compared to a threshold in decision module 260. If the maximum correlation value exceeds this threshold the cognitive system considers that signal s(t), identified by its digital signature w(t), is present in the band of interest. It will conclude from this, in the envisaged scenario, that a primary system, or alternatively that a cognitive system, is present in the band of interest. Conversely, if the maximum correlation value is less than the said threshold, the cognitive system considers that signal s(t), identified by its digital signature w(t), is absent from the band of interest, and the contrary conclusions will be drawn in the two abovementioned scenarios.

Figure 3:
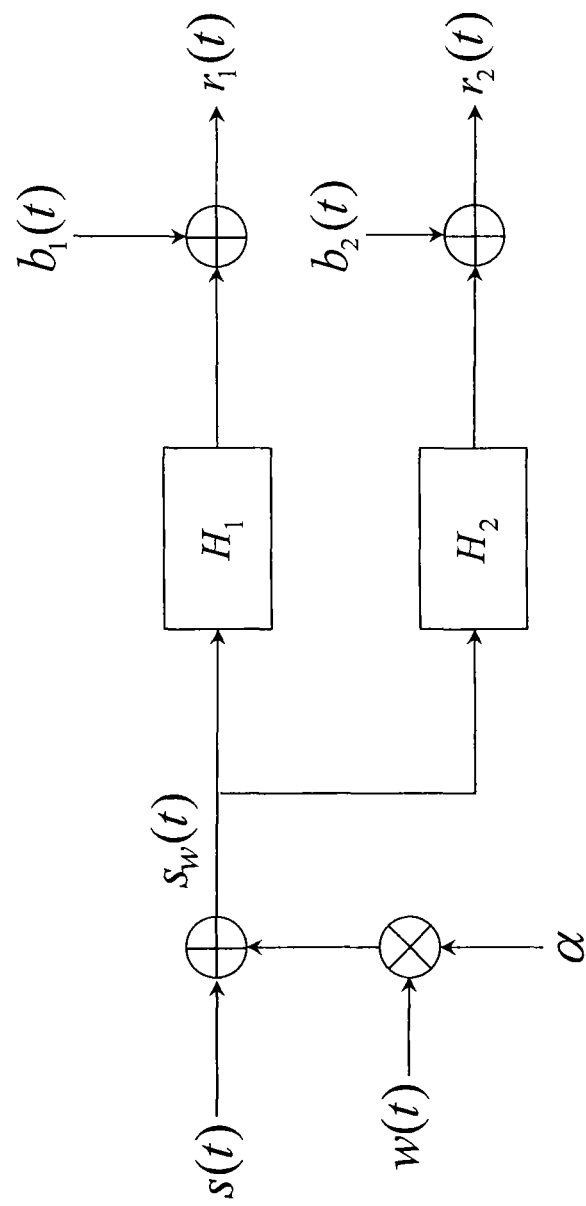
FIG. 3 represents the modelling of a watermark of a signal for a first user, and of its detection by a second user.

FIG. 3 illustrates the principle of watermarking of a signal for a first user, and its detection by a second user.

It is recalled that the signal watermarked by the transmitter of a primary or cognitive system, $s_w(t)$, is obtained by adding a digital signature $w(t)$ to the signal to be transmitted. It is supposed that digital signature $w(t)$ may be considered to be a random variable obeying a normal law, or in other words: $w(t) \sim N(0, \sigma_w^2)$. If the watermarking power is set $\sigma_w^2 = 1$, the insertion power of the watermarked signal depends solely on weighting coefficient $\alpha$, and is characterised by the WSR (Watermark to Signal Ratio) given by:

$$WSR = 10 \log \left( \frac{\alpha^2}{\sigma_s^2} \right) \quad (1)$$

where $\sigma_s^2$ is the power of the transmitted signal. Weighting coefficient $\alpha$ is advantageously chosen such that a compromise is obtained between the performance of the targeted application and the desired detection sensitivity, i.e. between −15 dB and −30 dB.

Watermarked signal $s_w(t)$ is received by the first user, via a pulse response channel $h_1(t)$, and by a second user via a pulse response channel $h_2(t)$. It is supposed in this case that the watermarked signal is intended for the first user, where the transmitter and the receiver respectively form part of a first cognitive system and of a second cognitive system in communication in a given band. The second user seeks to determine whether watermarked signal $s_w(t)$ is present (hypothesis H1) or absent (hypothesis H0) in this band.

When the watermarked signal is absent from the band the signal received by the second user may be expressed by:

$$r_2(t) = b_2(t) \quad (2)$$

where $b_2(t)$ is a Gaussian additional white noise. In a similar manner, if the case (hypothesis H0) is envisaged in which a non-watermarked signal is present in the band (where the watermark is used to discriminate the noise, but also the non-watermarked signals), the signal received by the second user is expressed as:

$$r_2(t) = s(t) + b_2(t) \quad (3)$$

Conversely, when the watermarked signal is present (hypothesis H1) the signal received by the second user is expressed by:

$$r_2(t) = h_2(t) X(s(t) + \alpha w(t)) + b_2(t) \quad (4)$$

With the intention of simplification, and notwithstanding generalisation, it will be supposed that $h_2(t) = \delta(t)$ where $\delta(.)$ is the Dirac function. The results however remain valid, whatever the function $h_2(t)$. The output of correlator 230 of the second user's receiver is consequently:

$$c = \frac{\langle b_2, w \rangle}{L} \quad (5)$$

in the case of hypothesis H0, and $$c = \frac{\langle s + b_2, w \rangle}{L} + \alpha \quad (6)$$

in the case of hypothesis H1, where $\langle x, y \rangle$ is the dot product of sequences of samples x and y, and where L is the length of these sequences, i.e. the length of the digital signature used for the watermarking.

Given that the signature is decorrelated from the noise and from the signal transmitted $E(c) \square 0$ in hypothesis H0 and $E(c) \square \alpha$ in hypothesis H1.

The second user's receiver decides between hypothesis H0 and hypothesis H1 by comparing the maximum expected value, max($E(c)$), with a threshold value. In practice, the expected value is estimated using a sliding average taken over N successive correlation values, as was seen above.

Watermarking of the signal enables the second user to detect its presence with a detection rate appreciably greater than by using the simple statistical properties of signal $s(t)$ (for example its cyclostationarity). For the first user, which demodulates signal $s(t)$ to recover the data transmitted by the transmitter, the presence of the digital watermarking only slightly degrades the signal-to-noise ratio.

The invention claimed is:

1. A method for a cognitive radio system, the method comprising:
    performing a digital modulation of symbols to be transmitted to obtain a stream of modulation symbols;
    adding a digital signature to the stream of modulation symbols to obtain a watermarked signal, the digital signature having an amplitude substantially lower than the modulation symbols; and
    transposing the watermarked signal into an RF band for transmission as an RF signal by a transmitter.

2. The method according to claim 1, wherein the watermarked signal is obtained by digitally adding the digital signature to the stream of modulation symbols, and by performing a digital-analog conversion of the resulting stream.

3. The method according to claim 1, wherein the watermarked signal is obtained by adding the digital signature in the form of a converted first analog signal to the stream of modulation symbols in the form of a second analog signal, the first analog signal being created by performing a digital-analog conversion of the stream of modulation symbols and the second analog signal being created by performing a digital-analog conversion of the digital signature.

4. The method according to claim 1, wherein the digital signature is a Gold code.

5. The method according to claim 1, wherein the digital signature is a Hadamard code.

6. The method according to claim 1, wherein the digital modulation is a multi-carrier modulation.

7. The method according to claim 1, wherein the digital modulation is a single-carrier modulation.

8. The method according to claim 1, wherein at least one of said performing, said adding, and said transposing is performed using the transmitter.

9. A method of detection by a cognitive radio system of a received RF signal, the detection method comprising:
    transposing said received RF signal to baseband to obtain an analog baseband signal;
    performing an analog-digital conversion of the analog baseband signal to obtain a digital signal;
    correlating the obtained digital signal with a predetermined digital signature to obtain a correlation value;
    comparing said correlation value to a threshold value; and
    deciding that said received RF signal is an RF signal having been transposed based on a watermarked signal obtained by adding a digital signature to a stream of modulation symbols if said correlation value is greater than the threshold value, and that said received RF signal is not the RF signal having been transposed based on the watermarked signal obtained by adding the digital signature to the stream of modulation symbols if said correlation value is less than said threshold value, the added digital signature having an amplitude substantially lower than the modulation symbols.

10. The detection method according to claim 9, wherein said correlating includes obtaining correlation values for multiple successive correlation windows, and wherein the correlation values are averaged.

11. The detection method according to claim 10, wherein the correlation values are averaged using a recursive filter with a forgetting coefficient.

12. The detection method according to claim 11, wherein a maximum correlation value is determined from the average correlation values supplied by the recursive filter, where said deciding is based on said maximum correlation value.

13. The detection method according to claim 9, wherein said digital signature is a Gold code.

14. The detection method according to claim 9, wherein said digital signature is a Hadamard code.

15. The detection method according to claim 9, further comprising receiving, using a receiver, said received RF signal.

16. The detection method according to claim 9, wherein at least one of said transposing, said performing, said correlating, said comparing, and said deciding is performed using a receiver.

* * * * *